Oct. 21, 1924.

H. H. BARBER 1,512,814

JOURNAL BEARING

Filed April 30, 1920

WITNESSES:
PJ Gathmann

INVENTOR
Harry H. Barber
BY Burton & Burton
HIS ATTORNEYS

Patented Oct. 21, 1924.

1,512,814

UNITED STATES PATENT OFFICE.

HARRY H. BARBER, OF AURORA, ILLINOIS, ASSIGNOR TO BARBER-GREENE COMPANY, OF AURORA, ILLINOIS, A CORPORATION OF ILLINOIS.

JOURNAL BEARING.

Application filed April 30, 1920. Serial No. 377,789.

*To all whom it may concern:*

Be it known that I, HARRY H. BARBER, a citizen of the United States, and a resident of the city of Aurora, county of Kane, and the State of Illinois, have invented certain new and useful Improvements in Journal Bearings, of which the following is a specification, reference being had to the accompanying drawings, forming a part thereof.

The purpose of this invention is to provide a journal bearing and supporting brackets for the same, especially adapted to insure sufficient lubrication of the bearing and simplify replacement of the latter when it becomes unduly worn. It consists of the features and elements of construction hereinafter described and shown in the drawings as indicated by the claims.

Figure 1:
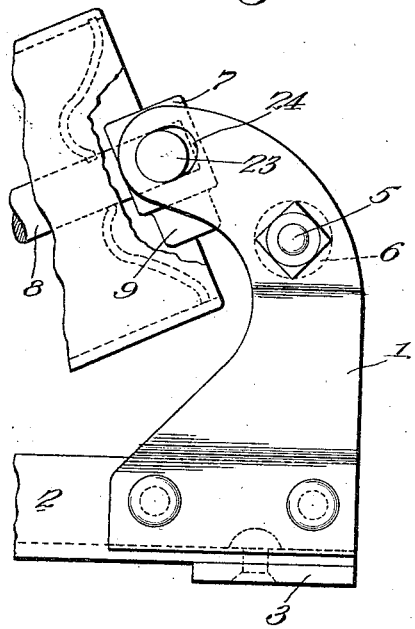
Figure 1 is a side elevation of a journal box embodying this invention together with brackets by which it is supported.

One of the features of the invention is that the entire journal box is made of a bearing metal such as Babbitt or the like, and die cast or produced in any other desirable or convenient manner, having the trunnions cast integral therewith. This construction of course obviates the necessity of lining a cast iron box with bearing metal, which involves more or less expense in making and replacing the parts. Other features will be pointed out in the course of the description.

As shown in the drawings, a journal box is supported by a pair of brackets, 1, 1, secured by any suitable means, as by rivets, to convenient structural members, 2, which are removably held together by the tie plate, 3, riveted to one and bolted at 4 to the other. At the upper portion of the bracket is a bolt, 5, and a spacer, 6, securely holding them in proper relation with each other for accommodating the bearing box 7, between them.

Figure 3:
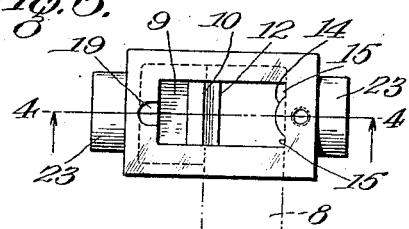
Figure 3 is a plan view of the box separated from the brackets, shown with the cover removed.
Figure 6:
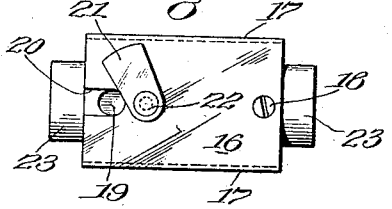
Figure 6 is a plan similar to Figure 3, but shown with the cover in place.
Figure 4:
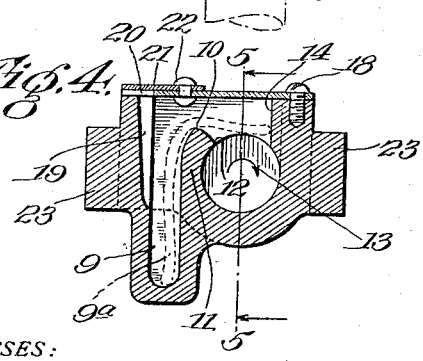
Figure 4 is a section taken at line 4—4 on Figure 3.
Figure 5:
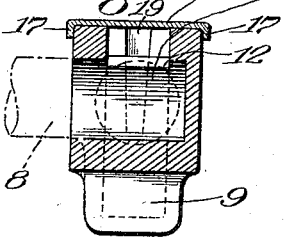
Figure 5 is a section taken at line 5—5 on Figure 4.

In the particular construction chosen for illustration, the bearing is designed to support one end of the shaft and the box, 7, is therefore provided with a single opening to receive the shaft as indicated in dotted lines at 8 in Figures 3 and 5. The journal bearing, 7, as will be seen from Figure 4, embraces a shaft, 8, at something less than three-fourths of its circumference, the bearing being open at the top for exposing the remaining area of the shaft journal for lubrication, and for this purpose there is provided an oil well, 9, at one side of the shaft depending somewhat below it for increased capacity and extending upward and terminating about level with the top thereof, as indicated at 10, while the surface of the wall, 11, slopes downward radially from that point to the shaft at 12.

A wick, $9^a$, made of some absorbent material such as cotton or the like, has one end thereof immersed in the oil with its other end overlying and contacting the shaft, whereby the lubricant is fed by capillary action to the desired point.

For the purpose of more evenly distributing the oil, as it is taken up by the shaft as it revolves in the direction indicated by the arrow, 13, there is provided a spreader device in the form of a boss, 14, jutting out convexly from the inner wall, 15, of the opening over the shaft.

A cover, 16, for closing the box is flanged at 17 to embrace the box at the top thereof, and is held in place by the screw, 18, placed through it at one end. The cover, 16, is spaced above the open side of the journal bearing by a considerable distance, forming a chamber which affords plenty of room for the wick, $9^a$, without compressing it and interfering with its capillary action. At the opposite end in registration with a groove, 19, in the wall of the well, is an oil hole, 20, in the form of a slot with a closure, 21, pivoted at 22.

The box, 7, has on either side thereof the trunnions, 23, 23, whose common axis intersects that of the bearing. The bracket arms, 1, 1, have at their upper ends above the bolt, 5, slotted holes, 24, 24, to receive the trunnions.

As will be readily understood, the slots, 24, extending substantially parallel to the shaft axis permit the box, 7, to accommodate itself to the exact direction of the shaft which it carries.

Figure 2:
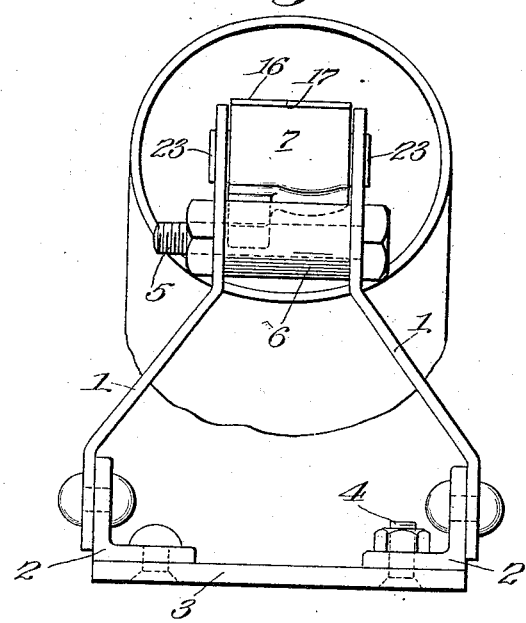
Figure 2 is an end elevation thereof.

By reason of the means of mounting the box, 7, as shown in Figures 1 and 2, the replacement of it when it becomes worn is a relatively simple matter. By merely loosening the bolts, 4 and 5, and spreading the brackets, 1, 1, the box can be readily removed, and since it is entirely made of bearing metal, it can be melted and remolded at small cost. It will be noted that, as compared with the usual work involved in replacing and relining the more common types of bi-metallic boxes, the present invention has many advantages.

I claim:

1. In combination with a journal bearing having its upper side cut away to expose the shaft journal and an oil well formed integral therewith at one side; a wick leading from the oil well and overlying the exposed portion of the journal, and a closure removably secured and dimensioned to cover the oil well and said exposed portion of the journal.

2. In combination with a journal bearing having its upper side cut away to expose the shaft and an oil well formed integral therewith at one side; a wick leading from said oil well overlying the exposed portion of the journal, the wall of the bearing member extending upward from the exposed area of the journal having a projection which extends convexly towards said journal for spreading oil longitudinally thereon.

In testimony whereof I have hereunto set my hand at Aurora, Ill., this 23rd day of April, 1920.

HARRY H. BARBER.